US010525990B2

(12) United States Patent
Clerici et al.

(10) Patent No.: US 10,525,990 B2
(45) Date of Patent: Jan. 7, 2020

(54) WIRING SYSTEM, IN PARTICULAR FOR THE CONNECTION BETWEEN CARRIAGES OF A RAILWAY VEHICLE

(71) Applicant: TECNIKABEL S.P.A., Turin (IT)

(72) Inventors: Diego Clerici, Volpiano (IT); Andrea Piccini, Volpiano (IT)

(73) Assignee: TECNIKABEL S.P.A. (IT)

( * ) Notice: Subject to any disclaimer, the term of this patent is extended or adjusted under 35 U.S.C. 154(b) by 0 days.

(21) Appl. No.: 16/095,516

(22) PCT Filed: Apr. 21, 2017

(86) PCT No.: PCT/IB2017/052316
§ 371 (c)(1),
(2) Date: Oct. 22, 2018

(87) PCT Pub. No.: WO2017/183000
PCT Pub. Date: Oct. 26, 2017

(65) Prior Publication Data
US 2019/0118841 A1     Apr. 25, 2019

(30) Foreign Application Priority Data
Apr. 22, 2016   (IT) .................. 202016000042040

(51) Int. Cl.
*H01R 13/62*    (2006.01)
*B61G 5/10*     (2006.01)
(Continued)

(52) U.S. Cl.
CPC ............ *B61G 5/10* (2013.01); *B61L 15/0036* (2013.01); *H01B 7/1805* (2013.01);
(Continued)

(58) Field of Classification Search
CPC ............... H01R 13/514; H01R 13/641; H01R 13/6586; H01R 2201/25; H01R 13/6335;
(Continued)

(56) References Cited

U.S. PATENT DOCUMENTS

| 6,745,911 | B1* | 6/2004 | Maestranzi | ............ | B61G 5/10 213/75 R |
| 2011/0130016 | A1* | 6/2011 | Lacey | ............ | H02G 3/18 439/108 |
| 2011/0248473 | A1 | 10/2011 | Emoto et al. | | |

FOREIGN PATENT DOCUMENTS

EP     2377714     10/2011

OTHER PUBLICATIONS

International Search Report for Corresponding Publication No. WO 2017/183000 dated Jan. 9, 2018. WO.

* cited by examiner

*Primary Examiner* — Jean F Duverne
(74) *Attorney, Agent, or Firm* — The Belles Group, P.C.

(57) ABSTRACT

A wiring system is described in particular for the electrical connection between a first and a second carriage of a railway vehicle; the wiring system has at least one mobile wiring having a first and a second end connected to a respective connector designed for coupling to fixed panel elements carried by facing outside walls of the first and respectively, second carriages. The mobile wiring has a single sheath enclosing a number of cables separate and distinct, each designed for a different application, jointly designed to provide complete connectivity in terms of data and control signals between the carriages. The wiring system also provides for a first and a second fixed wiring, each arranged at a respective carriage, and designed to interface electrically with a respective end of the mobile wiring for the corresponding electrical connection to on-board equipment.

7 Claims, 3 Drawing Sheets

(51) Int. Cl.
  *B61L 15/00* (2006.01)
  *H01B 7/18* (2006.01)
  *H01R 13/514* (2006.01)
  *H01R 13/633* (2006.01)
  *H01R 13/641* (2006.01)
  *H01R 13/6586* (2011.01)
  *H01R 27/02* (2006.01)
  *H02G 11/00* (2006.01)
  *H01B 7/00* (2006.01)

(52) U.S. Cl.
  CPC ....... *H01R 13/514* (2013.01); *H01R 13/6335* (2013.01); *H01R 13/641* (2013.01); *H01R 13/6586* (2013.01); *H01R 27/02* (2013.01); *H02G 11/00* (2013.01); *H01B 7/0009* (2013.01); *H01R 2201/26* (2013.01)

(58) Field of Classification Search
  CPC ........ H01R 27/02; H01B 7/1805; B61G 5/10; H02G 11/00; H02G 3/18; B61L 15/0036
  USPC ......................................................... 439/153
  See application file for complete search history.

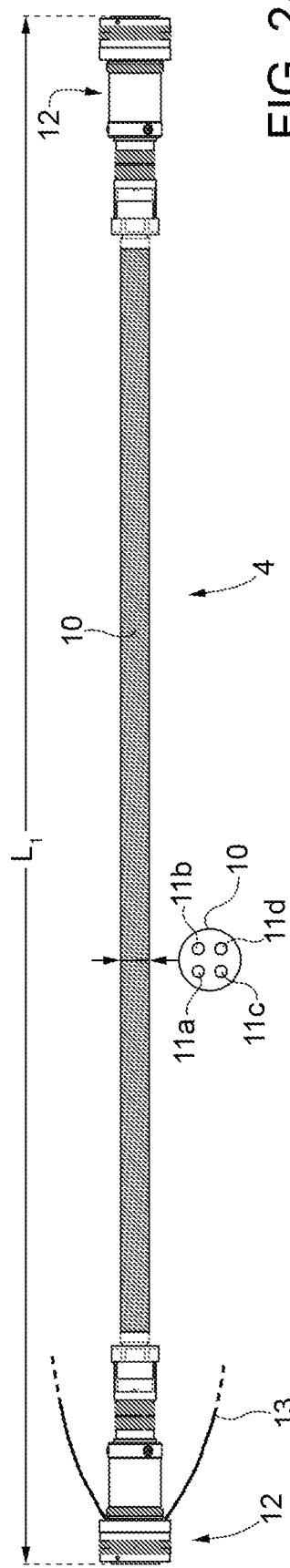
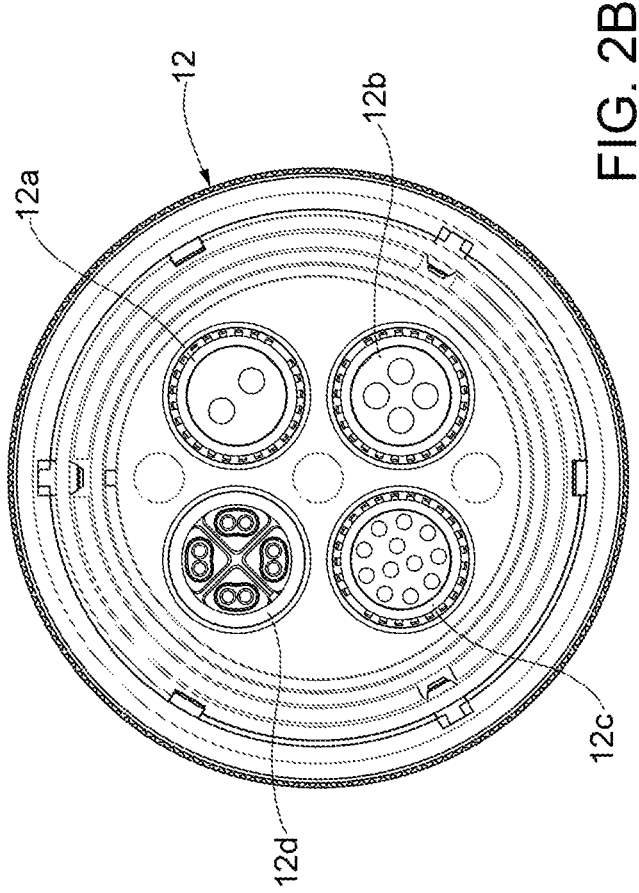

WIRING SYSTEM, IN PARTICULAR FOR THE CONNECTION BETWEEN CARRIAGES OF A RAILWAY VEHICLE

CROSS-REFERENCE TO RELATED PATENT APPLICATIONS

The present application is a U.S. national stage application under 35 U.S.C. § 371 of PCT Application No. PCT/IB2017/052316, filed Apr. 21, 2017, which claims priority to Italian Patent Application No. IT202016000042040, filed Apr. 22, 2016. The disclosures of the aforementioned priority applications are incorporated herein by reference in their entireties.

TECHNICAL FIELD

The present invention relates to an improved wiring system, particularly designed for the connection between carriages of a railway vehicle.

BACKGROUND ART

As it is known, communication infrastructures are used within railway vehicles, for transmitting data and control signals between carriages of the same railway vehicle or towards ground control stations.

Usually, the communication infrastructure provides for a wired communication network between the carriages of the railway vehicle, in particular including an Ethernet type data communication network, and a wireless connection with the ground control stations, in particular via the cellular network, implementing for example the 4G standard.

Such communication infrastructure allows, among other features, to implement a complete connectivity platform for on board applications, generally indicated as PIS, Passenger Information System.

In particular, such system assures that passengers receive a plurality of audio and video information relative to the journey or information of a promotional or cultural nature (magazines, real time news, etc.), for example via monitors provided on board the carriages and/or audio speaker systems; the system further provides management, for example via mobile electronic devices, belonging to the passengers, of multimedia content and public entertainment.

The aforesaid PIS system also allows management and diagnostics, even in real time, of all on-board electronic devices and equipment, implementation of passenger safety thanks to video surveillance systems with localised filming and remote access, and counting of passengers, so-called "people counter" or "passenger counter", for the automated acquisition of the number of passengers carried per train.

In essence, therefore, this system advantageously provides an improvement of passenger satisfaction, but also increased safety on board with video surveillance, the detection of possible failures or fires, and improvement of maintenance tasks.

In more detail, the Ethernet data communication network provides that each electronic device on board has its own IP address and can support SNMP diagnostics managed by a centralised GPS unit, being able in turn to connect without interruption to the ground via a mobile connection, for example via a mobile 4G network.

This way, not only the electronic/electric elements, but virtually any on-board component can be monitored by special sensors, for ageing, wear, malfunction or failures.

In addition, the data monitored can be used to generate alarms to report emergencies, which may be transmitted to ground stations together with other contextual information such as position, speed, temperature, or otherwise, for further analysis, storing in databases for statistical purposes or forecasting of faults.

The effective implementation of the communication infrastructure described above requires effective and safe wiring systems inside the railway vehicle carriages and between the carriages.

In this regard, the wired connection between adjacent carriages of the railway vehicle is particularly critical, since these carriages are subject, in use, to all types of reciprocal motion, stress and vibrations; the wiring systems used must therefore be able to withstand the resulting continuous and repetitive stresses and strains, bending and oscillation, and also every possible environmental condition while the railway vehicle is running.

The wiring solutions currently used to connect adjacent carriages in railway vehicles and transmit data and control signals envisage use of a so-called UIC cable with 18 poles, provided with corresponding connectors designed for coupling with complementary connectors on the carriages; and in addition, for the Ethernet data connection, the use of a special cable, category CAT.5e or category Cat.7, both in the 24AWG version, for the transmission of 1000BASE-TX signals terminating in respective connectors designed for coupling with further connectors on the carriages.

The present Applicant has verified that such wiring systems are not without problems, especially with regard to the complexity of installation and maintenance operations, as well as regards safety in emergency conditions.

It has indeed been verified that it is common practice in case of emergencies, when detaching the carriages, to rip the cables, on account of the fixed coupling currently in place, with consequent irreparable damage to the wiring.

The present Applicant has therefore ascertained that the need is felt for an improved wiring system which, among other features, overcomes the drawbacks set out above.

DISCLOSURE OF INVENTION

The purpose of the present invention is to provide a solution to such need.

According to the present invention, an improved wiring system is therefore provided, as defined in the appended claims.

BRIEF DESCRIPTION OF THE DRAWINGS

For a better understanding of the present invention, preferred embodiments thereof will now be described by way of non-limiting examples and with reference to the appended drawings, wherein:

FIG. 2a shows an embodiment of a mobile wiring in the wiring system of FIG. 1;

FIG. 2b shows a front view of a coupling connector of the mobile wiring in FIG. 2a;

FIG. 3b shows a front view of a coupling connector of the fixed wiring of FIG. 3a.

BEST MODE FOR CARRYING OUT THE INVENTION

Figure 1:
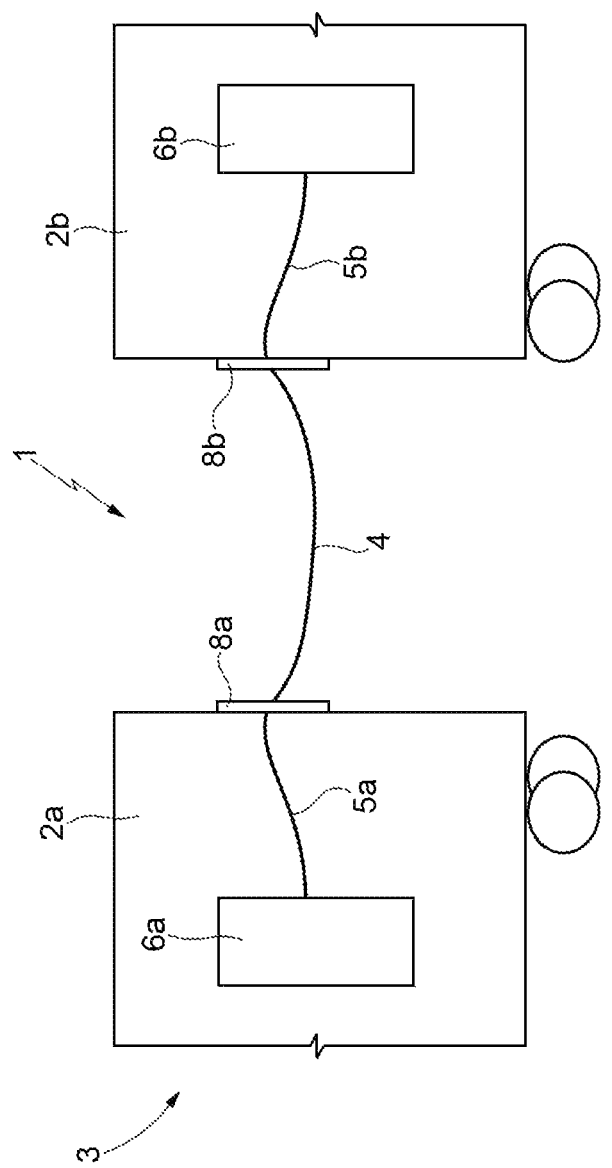
FIG. 1 is a simplified block diagram of a wiring system between carriages of a railway vehicle, according to one aspect of the present invention.

In general, the present solution refers, as schematically in FIG. 1, to a wiring system, denoted as a whole by reference numeral 1, for connecting two carriages 2a, 2b, of a railway vehicle 3, which undergo, during operation, reciprocal movements according to various degrees of freedom.

The wiring system 1 comprises:

a mobile wiring 4, arranged between the carriages 2a, 2b and designed therefore to endure the relative reciprocal movements (such mobile wiring 4 is defined in the jargon as "hanging" or "jumper" cable); and a first and a second fixed wiring 5a, 5b, each placed at a respective carriage 2a, 2b, and designed to interface electrically to a respective terminal end of the mobile wiring 4 for the corresponding electrical connection to an on-board equipment 6a, 6b, called "cabinet".

In particular, the aforesaid terminal ends of the mobile wiring 4 couple, with panel connectors, to a fixed panel element 8a, 8b, carried by the facing outside wall of the respective carriage 2a, 2b, usually referred to as "junction box"; a respective end of the first or second fixed wiring 5a, 5b reaches the same fixed panel element 8a, 8b, coupling via a respective panel connector.

In more detail, as shown in FIGS. 2a and 2b, the mobile wiring 4 encloses, according to one aspect of the present solution, within a single sheath 10, of the corrugated type with IP67 protection, four separate and distinct cables, each designed for a different application, designed to provide jointly complete connectivity in terms of data and control signals between adjacent carriages 2a, 2b, and in particular:

a first cable 11a, with two conductors, wired in a respective dedicated shielded module;

a second cable 11b, with four-core and 120 Ohm controlled impedance, shielded and wired in its own dedicated module;

a third cable 11c, with twelve conductors, shielded and wired in its own dedicated module; and in addition a fourth cable 11d, AWG23 four pair CAT.7A Ethernet specifically for the "railway jumper" application.

In this regard, it should be noted that the division of the wiring into different cables has some important advantages: firstly, the manual wiring operation is significantly easier; in addition, considering that the cables are individually shielded, a higher division thereof offers higher quality wiring; also in terms of electromagnetic compatibility, groups of similar conductors, individually shielded, produce better shielding effects than a single shielded total group, other conditions being equal.

The individual cables 11a-11d, in a possible embodiment of length $L_1$ approximately equal to 2 metres, have a marking on the outer surface that identifies the type in order to facilitate their identification, and thus the wiring. The internal locking of the cables is via "grommets" and "clamps".

The single sheath 10 is appropriately fitted at its ends for fastening to a respective connector 12.

The sheath 10 also has a shorter length (for example approximately 10 cm) to the distance between the two connectors 12, so as to facilitate the wiring and its maintenance. The coating of the portion left bare by the sheath 10 is obtained by means of a casing (not shown) sliding on the sheath 10 which, when the wiring has been completed, is blocked on one side to the connector 12, while on the opposite side it overlaps the sheath 10.

As shown in detail in FIG. 2b, each connector 12, according to one aspect of the present solution is modular and contains within it four separate connector modules, each connector module being dedicated to one of the four cables 11a-11d, being independently shielded and individually sealed; each connector module can also be individually assembled and tested before being inserted in the connector 12.

In essence, each single connector module can be thought of as an independent connector which can be inserted in the same connector 12, already complete with relative shielding and retention of the respective cable. The various connector modules also have a guide system which ensures accurate and reliable positioning.

The connector 12 comprises therefore:

a first connector module 12a, with two contacts, to receive the first cable 11a;

a second connector module 12b, with four contacts, to receive the second cable 11b;

a third connector module 12c, with twelve contacts, to receive the third cable 11c; and a fourth connector module 12d, for Ethernet cable, to accommodate the fourth cable 11d.

The connector 12 is provided with a coupling ring-nut and fitting for the sheath 10, of the corrugated type.

In particular, the coupling of the connector 12 to a corresponding panel connector (see discussion below) on the fixed panel element 8a, 8b of the respective carriage 2a, 2b is of the interlocking, or bayonet, type with rotation manoeuvre of the corresponding ring-nut; advantageously, the complete closure of the connection can be perceived with a tactile and auditory "click" to ensure correct insertion.

The snap-disengagement of the connector 12 is by rotation manoeuvre in the opposite direction on the ring-nut.

Advantageously, there is also a quick-release mechanism, of the bayonet type or tear type, acting on a pull rope 13 (shown schematically in FIG. 2a), for example of a metallic material, connected to the connector ring-nut 12.

Each fixed wiring 5a, 5b is configured to couple to the mobile wiring 4.

Figure 3A:
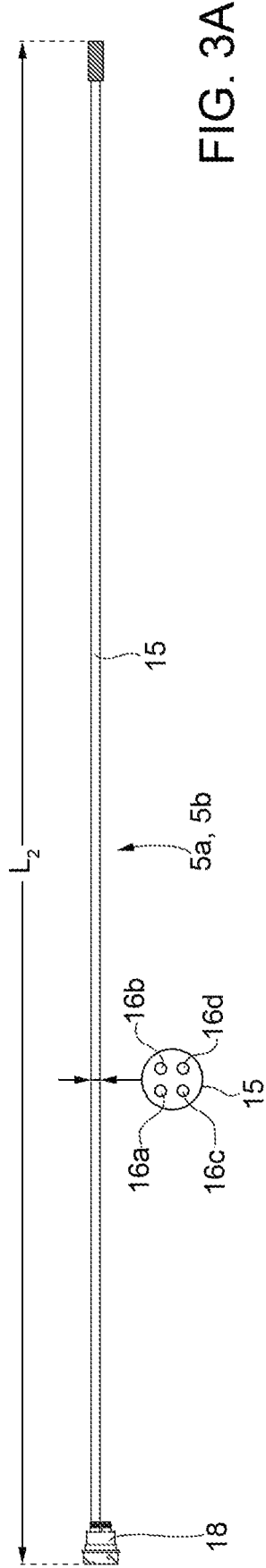
FIG. 3a shows an embodiment of a fixed wiring in the wiring system of FIG. 1.
Figure 3B:
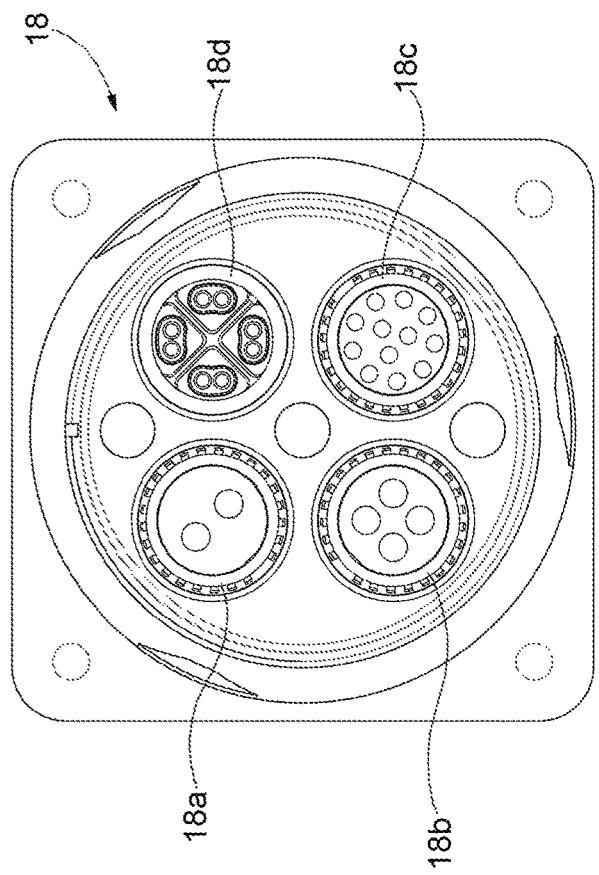

Accordingly, as shown in FIGS. 3a and 3b, substantially in the same manner as shown above, each fixed wiring 5a, 5b encloses within a respective sheath 15, four separate and distinct cables, designed to provide the connection between the respective fixed panel element 8a, 8b and the respective on-board equipment 6a, 6b, and in particular:

a respective first cable 16a with two conductors, wired in a respective dedicated shielded module;

a respective second cable 16b, with four-core and 120 Ohm controlled impedance, shielded and wired in its own dedicated module;

a respective third cable 16c, with twelve conductors, shielded and wired in its own dedicated module; and in addition a respective fourth cable 16d, AWG23 four pair CAT.7 Ethernet, specifically for the "railway jumper" application.

The cables 16a-16d, in a possible embodiment, have a length $L_2$ varying depending on the position of the relative on-board equipment 6a, 6b, and having a different outer appearance so as to facilitate the identification thereof and thus the wiring operation.

Each fixed wiring 5a, 5b has, at a first end, a respective panel connector 18, configured to be assembled integrally with the respective fixed panel element 8a, 8b and to couple in a releasable manner to the connector 12 of the mobile wiring 4 (in an evident manner, the panel connector 18 is a "male" or socket connector, in the case in which the connector 12 is a "female" or plug connector).

In the embodiment shown, the second end of each fixed wiring 5a, 5b, in the case of cables 16a-16, is left free (without a connector), while the fourth cable 16d ends with a TERA cat.7 AWG 23 1 GHz connector, so as to allow the appropriate electrical connection with the respective on-board equipment 6a, 6b, as required each time.

In the same manner as discussed above, the panel connector 18 also has a modular configuration and encloses within it four separate connector modules, wherein each connector module is dedicated to one of the respective four cables 16a-16d, is independently shielded and is individually sealed; each connector module can also be individually assembled and tested before being inserted in the panel connector 18.

The panel connector 18 comprises therefore:

a respective first connector module 18a, with two contacts, to receive the first cable 16a;

a respective second connector module 18b, with four contacts, to receive the second cable 16b;

a respective third connector module 18c, with twelve contacts, to receive the third cable 16c; and a respective fourth connector module 18d, to receive the fourth cable 16d.

The panel connector 18 has a snap-coupling system, in the example with a three-ramp bayonet; and a snap (with bayonet) or tear disengagement, as discussed above with respect to the connector 12, complementary to it.

The advantages of the present solution emerge clearly from the above description.

In any case, it should again be noted that it allows full connectivity between adjacent carriages 2a, 2b of the railway vehicle 3 and also inside the carriages themselves towards the on-board equipment 6a, 6b.

The wiring system 1 offers high safety performance, thanks to the configuration of the cables and connectors, and also to the presence of the quick-release tear mechanism, which allows in an emergency, smooth separation of the carriages 2a, 2b without the wiring being ripped and damaged, as is the case in the known systems.

In addition, the wiring system 1 proves simple to construct and facilitates servicing and maintenance by wiring operators.

In particular, thanks to the simple coupling and decoupling of the connectors 12, 18, the assembly and dismantling times are reduced significantly, a feature which is very useful during servicing and maintenance. Also, thanks to the fact that the complete closure of the connection can be perceived with a tactile and auditory ("click"), operators are able to operate even in hard-to-reach installations where space is limited. The solution described offers in fact the certainty of having performed correct coupling even when this cannot be visually checked.

Conveniently, the wiring system 1 makes it possible to obtain certified quality and guarantees durability. In particular, the wiring system 1 is tested in its entirety, in all its parts, using the cable analyzer FLUKE DSX 5000 and each single wiring is accompanied by a test report.

Lastly, it is evident that modifications and variations may be made to what has been described and illustrated herein while remaining within the scope of the present invention, as defined in the appended claims.

In particular, it is evident that the internal structure and composition of the wiring system 1 can differ, for example as regarding the number and arrangement of the cables 11a-11d, 16a-16d and/or connector modules 12a-12d, 18a-18d.

It will also be evident, to a person skilled in the art that the solution described also lends itself to different types of use, even outside the railway field, although, for the reasons previously outlined, it is especially beneficial in this area and sphere of use.

The invention claimed is:

1. A wiring system for the electrical connection between a first and a second carriage of a railway vehicle, said wiring system including at least one mobile wiring having a first and a second end connected to a respective connector designed for coupling to fixed panel elements carried by facing outside walls of the first and respectively second carriages, wherein said mobile wiring has a single sheath enclosing a number of separate and distinct cables, each designed for a respective application, jointly designed to provide complete connectivity in terms of data and control signals between said first and second carriages, wherein the cables comprise a first cable with two conductors, wired in a respective dedicated shielded module; a second cable with four conductors, with controlled impedance, shielded and wired in its own dedicated module; a third cable with twelve conductors, shielded and wired in its own dedicated module; and a fourth cable, with four pairs of conductors of an AWG-23 cat-7a Ethernet data communication type, wherein said connector is designed for coupling to a panel connector fitted in the respective fixed panel element with a safety release mechanism for quick disconnection in case of separation between said first and second carriages, wherein said connector is modular and contains within it a number of separate connector modules, each connector module being dedicated to a respective one of the cables, being independently shielded and individually sealed, and wherein the connector modules comprise a first connector module, with two contacts, to receive the first cable; a second connector module, with four contacts, to receive the second cable; a third connector module, with twelve contacts, to receive the third cable; and a fourth connector module, for Ethernet cable, to accommodate the fourth cable.

2. The system according to claim 1, wherein said release mechanism is of the bayonet or tear type, provided with a pull rope connected to a ring-nut of the connector.

3. The system according to claim 1 in which the complete coupling of said connector and said panel connector provides a tactile and/or auditory signal to a user.

4. The wiring system according to claim 1, further comprising a first and a second fixed wiring, each arranged at a respective carriage of said first and second carriages and designed to interface electrically with a respective first or second end of the mobile wiring for the corresponding electrical connection to an on-board equipment inside said first and second carriages.

5. The system according to claim 4, wherein each of said first and second fixed wirings has a respective sheath enclosing a corresponding number of cables separate and distinct, and also carries, at a first end, a panel connector designed to be assembled integrally with the respective fixed panel element and to couple in a releasable manner to the connector of the mobile wiring.

6. The system according to claim 5, wherein said panel connector is modular and contains within it a number of separate connector modules, wherein each connector module is dedicated to a respective cable, independently shielded and individually sealed.

7. The system according to claim 6, wherein each of said first and second fixed wirings has a second free end, designed for electrical connection with the respective on-board equipment.

\* \* \* \* \*